United States Patent [19]
Wagatsuma

[11] 3,977,699
[45] Aug. 31, 1976

[54] SHOCK-ABSORBING PUSH-PULL COUPLING FOR TANDEM SCRAPERS

[75] Inventor: Toshiaki Wagatsuma, Fujisawa, Japan

[73] Assignee: Kabushiki Kaisha Komatsu Seisakusho, Tokyo, Japan

[22] Filed: June 9, 1975

[21] Appl. No.: 585,182

[30] Foreign Application Priority Data
June 12, 1975 Japan.................. 49-67345

[52] U.S. Cl................. 280/481; 280/477
[51] Int. Cl.²......................... B60D 3/00
[58] Field of Search .......... 280/481, 483, 484, 485, 280/486, 487, 477, 478 R, 491 R; 267/138, 141, 152, 153; 37/126, 129

[56] References Cited
UNITED STATES PATENTS

| | | | |
|---|---|---|---|
| 1,884,323 | 10/1932 | Snow | 280/487 |
| 2,783,039 | 2/1957 | Wilson | 267/138 |
| 3,243,203 | 3/1966 | Hermiz et al. | 280/481 |
| 3,434,738 | 3/1969 | Campbell et al. | 280/490 R X |
| 3,740,080 | 6/1973 | Kuhl | 280/481 |
| 3,906,613 | 9/1975 | Chappell | 280/481 |

Primary Examiner—M. H. Wood, Jr.
Assistant Examiner—R. Schrecengost
Attorney, Agent, or Firm—Oblon, Fisher, Spivak, McClelland & Maier

[57] ABSTRACT

A coupling capable of selectively connecting and disconnecting tractor-scraper units so that they may operate either in push-pull tandem relation or individually. A first push block and pulling hook are arranged at the rear of the front tractor-scraper unit, whereas on the front of the rear unit there are arranged a second push block for contact with the first push block and a ball for engagement of the pulling hook. The second push block is pivotally supported at its top end, and the bail is pivotally connected to the bottom end of the second push block. Arranged between the bottom end of the second push block and the tractor framework of the rear unit are a pair of what are herein termed two-way shock-absorber assemblies which are dually effective to minimize the shocks caused upon contact between the first and second push blocks and upon engagement of the pulling hook by the bail.

5 Claims, 4 Drawing Figures

SHOCK-ABSORBING PUSH-PULL COUPLING FOR TANDEM SCRAPERS

BACKGROUND OF THE INVENTION

My invention relates generally to construction machines or earthmovers, and in particular to scrapers towed behind a tractor and used principally for excavation and hauling purposes. Even more particularly, my invention is directed to some improvements in a push-pull coupling capable of selectively connecting and disconnecting such tractor-scraper units so that they may operate either in tandem or as independent units.

The push-pull coupling for a tandem arrangement of tractor-scraper units, as heretofore made, typically comprises a push block and pulling hook arranged at the rear of a front tractor-scraper unit, and another push block and bail on the front of a rear unit, as taught in Campbell et al U.S. Pat. No. 3,434,738, issued Mar. 25, 1969. The two push blocks made contact with each other when the tractor-scraper units are coupled together in pushing relation, and the shock produced at this juncture is reduced as by a pair of spring groups which can be associated with either of the push blocks.

The noted U.S. patent, however, reveals no means for reduction of the shock that is produced also upon engagement of the pulling hook by the bail, that is, upon establishment of a pulling relation between the tractor-scraper units. This deficiency is an inevitable result of the fact that the pulling hook and bail are both rigidly connected to the respective frameworks of the front and rear tractor-scraper units. As a consequence, the frameworks directly suffer the shock caused upon engagement of the pulling hook by the bail.

SUMMARY OF THE INVENTION

In view of the noted defect of the prior art, it is an object of my invention to provide an improved push-pull coupling for tandem tractor-scraper units which is capable of absorbing the energy of shock developing upon establishment of both pushing and pulling relations between the units.

With this and other objects in view, my invention provides a push-pull coupling of the type consisting essentially of a first coupling section disposed at the rear of a front tractor-scraper unit and a second coupling section on the front of a rear tractor-scraper unit. The first coupling section, which can be largely conventional, comprises a first push block and a pulling hook formed thereover.

Characteristically, the second coupling section comprises a second push block pivotally supported at or adjacent its top end and adapted for contact with the first push block to establish a pushing relation between the tractor-scraper units, and a bail pivotally connected to the second push block at or adjacent the bottom end of the latter and adapted for engagement of the pulling hook to establish a pulling relation. Two-way shock-absorber means is arranged between the bottom end of the second push block and the tractor framework of the rear unit to lessen the shocks produced upon establishment of both pushing and pulling relations between the tractor-scraper units. The constructional details of a typical example of the two-way shock-absorber means will be disclosed in the succeeding description of a preferred embodiment.

The features which are believed to be novel and characteristic of this invention are set forth in particular in the appended claims. The invention itself, however, both as to its organization and mode of operation, together with the additional objects and advantages thereof, will become apparent as the description proceeds, with reference had to the accompanying drawings in which like reference characters denote corresponding parts of the several views.

DESCRIPTION OF THE PREFERRED EMBODIMENT

Figure 1:
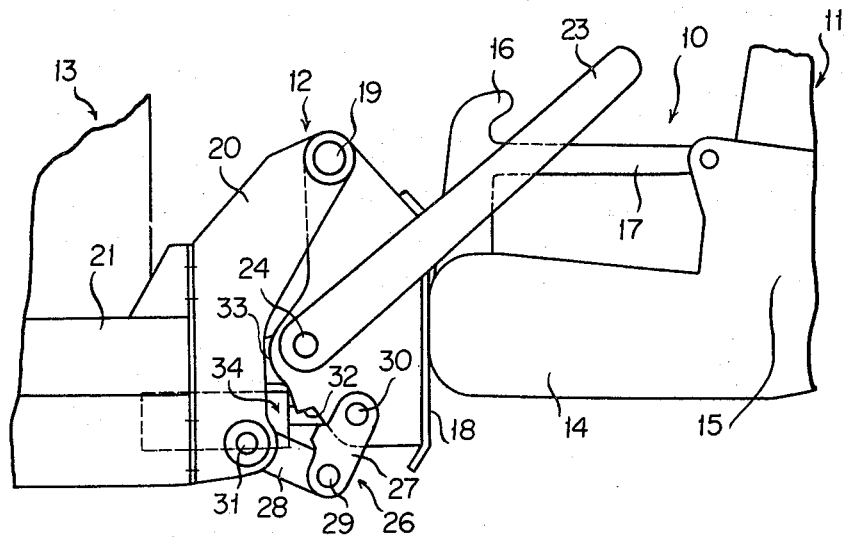
FIG. 1 is a side elevational view of the push-pull coupling constructed in accordance with the novel concepts of my invention, the coupling being shown with its first and second sections in pushing relation between tandem tractor-scraper units.
Figure 2:
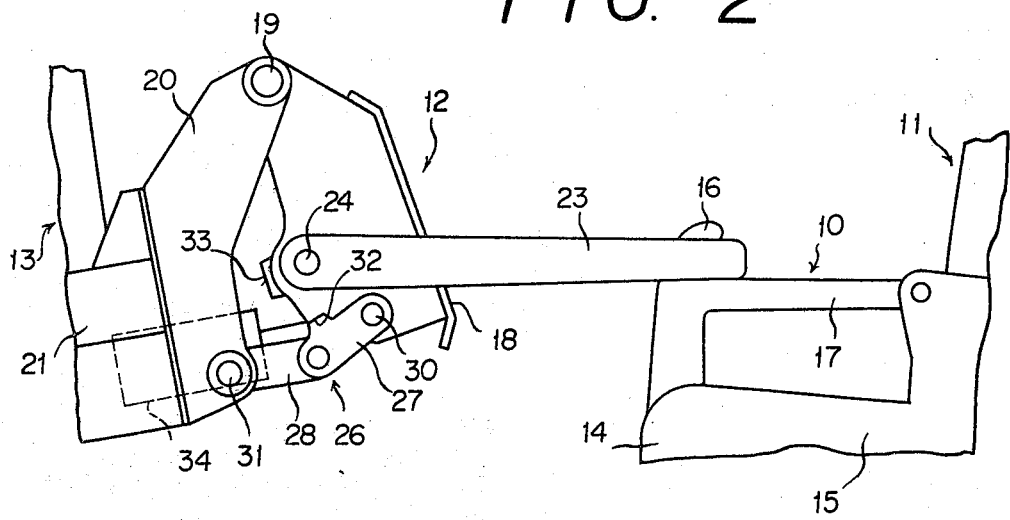
FIG. 2 is a view similar to FIG. 1 but showing the first and second sections of the push-pull coupling in pulling relation.

With particular reference to FIGS. 1 and 2, the push-pull coupling according to my invention broadly comprises a first coupling section 10 arranged at the rear of a front tractor-scraper unit 11 and a second coupling section 12 arranged on the front of a rear tractor-scraper unit 13. Because of the conventional and well-known nature of each tractor-scraper unit, the drawings fragmentarily show only the scraper of the front unit 11 and the tractor of the rear unit 13, in conjunction with the first and second coupling sections 10 and 12, respectively, to facilitate illustration.

The first coupling section 10 includes a first push block 14 which is fixedly provided at the rear of the front tractor-scraper unit 11 and which, in one form of construction, constitutes an integral part of the scraper framework 15 of the front unit. A pulling hook 16 is mounted centrally over the first push block 14 and is rigidly connected to the front scraper framework 15 as by a pair of forwardly diverging braces 17. It is understood, however, that this construction of the first coupling section 10 is conventional, as disclosed for example in the aforementioned U.S Pat. No. 3,434,738, and does not, by itself, constitute a part of the present invention.

Figure 3:
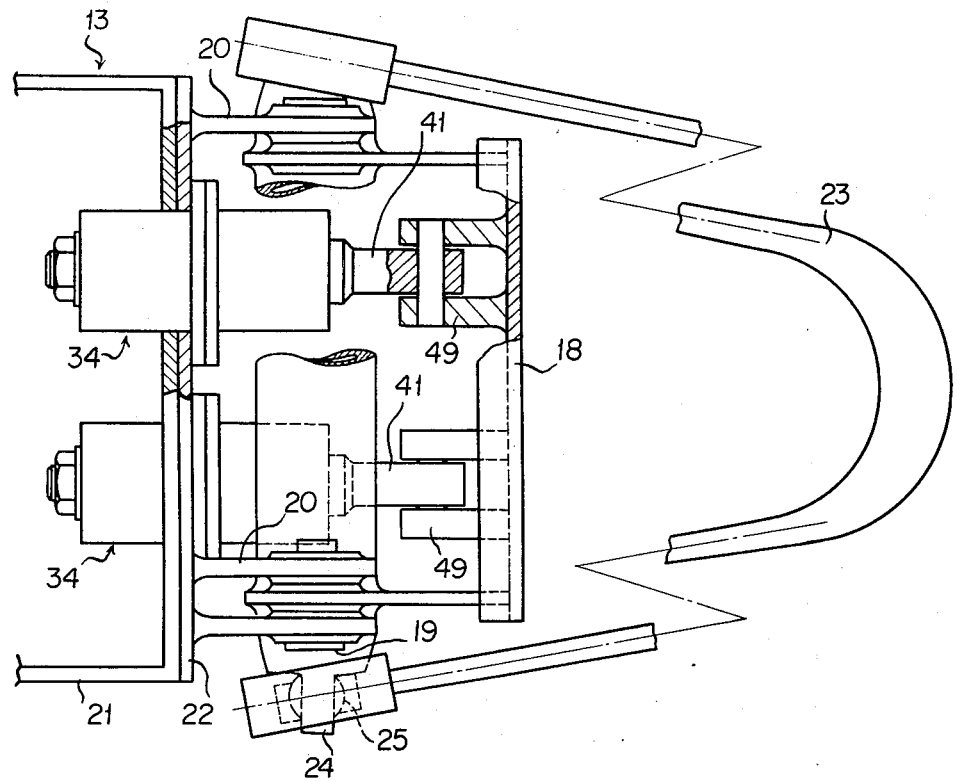
FIG. 3 is an enlarged top plan view, partly broken away, of the second section of the push-pull coupling shown in FIGS. 1 and 2.

The invention is specifically directed to the second coupling section 12 shown in FIGS. 1 and 2 and in more detail in FIG. 3. The second coupling section includes a second push block or plate 18 adapted for contact with the first push block 14 when the first and second coupling sections 10 and 12 are in pushing relation. The second push block 18 has its top end pivotally pinned at 19 to support means taking the form of brackets 20 extending forwardly from the tractor framework 21 of the rear tractor-scraper unit 13. These brackets can be jointly bolted or otherwise removably fastened to the rear tractor framework 21 via a mounting plate designated 22 in FIG. 3.

A bail 23 of substantially V-shaped configuration has its both ends pivotally connected to the second push block 18 at or adjacent its bottom end by means of pins 24 and spherical bushings 25. The bail 23 will engage the pulling hook 16 on the front tractor-scraper unit 11 in the use of this push-pull coupling, to establish a pulling relation between its first and second sections 10 and 12. While this bail is shown to be of manual type, it is of course possible to provide a hydraulic jack or jacks or some other equivalent means to control its position, as has been known heretofore.

In order to limit the counterclockwise swinging motion, as viewed in FIGS. 1 and 2, of the second push block 18 upon engagement of the pulling hook 16 by the bail 23, a pair of flexible linkages 26 are provided between the bottom end of the second push block and the brackets 20. The flexible linkages 26 are disposed at both lateral ends of the second push block 18 and each comprises two links 27 and 28 pivotally pinned at 29 to each other. The link 27, moreover, is pivotally pinned at 30 to the second push block 18, and the other link 28 is likewise pinned at 31 to the bracket 20. The second push block 18 has formed thereon an abutment 32 for limiting the pivotal motion of the link 27 of each flexible linkage, as will be later explained in more detail.

Seen at 33 in FIGS. 1 and 2 are abutments formed on the second push block 18 so as to move into contact with the brackets 20 upon contact of the second push block with the first push block 14. The abutments 33 are thus intended to limit the clockwise swinging motion of the second push block upon establishment of a pushing relation between the front and rear tractor-scraper units 11 and 13.

One or more, two in the illustrated embodiment, two-way shock-absorber assemblies 34 are arranged between the bottom end of the second push block 18 and the tractor framework 21 of the rear tractor-scraper unit 13.

Figure 4:
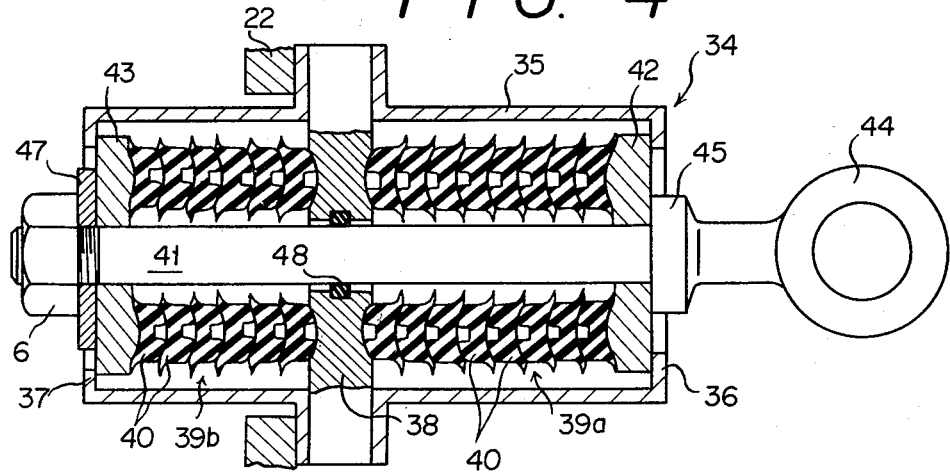
FIG. 4 is an axial sectional view of one of the two-way shock-absorber assemblies incorporated in the push-pull coupling shown in FIGS. 1, 2 and 3.

As illustrated in greater detail in FIG. 4, each two-way shock-absorber assembly 34 includes a hollow, cylindrical housing 35 stably mounted on the rear tractor framework 21 via the mounting plate 22. The housing 35 includes end plates 36 and 37 which are apertured centrally therethrough. A partition 38 of rigid material divides the interior of the housing 35 into a pair of opposed chambers accommodating shock-absorbing media 39a and 39b, respectively.

Each of the shock-absorbing media 39a and 39b consists of a coaxial arrangement of preloaded annular pads 40 of rubber or like resilient material which surround with clearance a rod 41 extending axially through the housing 35. The shock-absorbing medium 39a is arranged between the partition 38 and a retainer 42 slidably mounted on the rod 41, and the other medium 39b between the partition and another retainer 43 also slidably mounted on the rod 41. These retainers are normally held at the opposite ends of the housing 35 by the respective end plates 36 and 37 and are movable toward and away from the partition 38 to cause compression and expansion of the respective shock-absorbing media 39a and 39b, as will more fully appear hereinbelow.

The rod 41 has its front end portion projecting out of the end plate 36 and terminates in a boss 44. A flange 45 is formed adjacent the front end of the rod 41 to engage the retainer 42, while a nut 46 is screw-threadedly fitted over the rear end of the rod to engage the other retainer 43 via a disc 47. Shown at 48 is a bushing mounted in the partition 38 to slidably support the rod 41.

As will be seen by referring again to FIG. 3, two pairs of brackets 49 extend rearwardly from the second push block 18 on the rear tractor-scraper unit 13. Each bracket pair 49 is adapted to pivotally support therebetween the boss 44 at the front end of the rod 41 of one of the two-way shock-absorber assemblies 34.

For establishment of a pushing relation between the front and rear tractor-scraper units 11 and 13, the rear unit may approach the front unit, with the bail held in its raised position, until the second push block 18 makes contact with the first push block 14 as shown in FIG. 1. The second push block 18 will thereupon swing clockwise about the pivot pins 19 until the abutments 33 on the second push block move into contact with the brackets 20.

With the clockwise swinging motion of the second push block 18, the rod 41 of each two-way shock-absorber assembly 34 will retract into the housing 35. The flange 45 transmits the retracting motion of the rod 41 to the retainer 42, causing the latter to travel rearwardly with the rod and hence to compress the shock-absorbing medium 39a between itself and the partition 38. The two-way shock-absorber assemblies 34 thus reduce the shock produced upon contact between the first and second push blocks 14 and 18.

Shown in FIG. 2 are the relative positions of the first and second coupling sections 10 and 12 during the pulling operation which may follow the above described pushing operation. Since the bail 23 is understood to extend forwardly beyond the pulling hook 16 during the pushing operation as shown in FIG. 1, the relative movement of the front and rear tractor-scraper units 11 and 13 away from each other will cause the bail to move readily into positive engagement with the pulling hook. The second push block 18 will then swing counterclockwise about the pivot pins 19 until the link 27 of each flexible linkage 26 moves into contact with the abutments 32 on the second push block.

At this instant the second push block 18 causes extension of the rod 41 of each two-way shock-absorber assembly 34 from within the housing 35. The nut 46 on the rear end of the rod 41 will cause, via the disc 47, the retainer 43 to travel forwardly with the rod to compress the shock-absorbing medium 39b between itself and the partition 38. The shock produced upon establishment of the pulling relation between the tractor-scraper units 11 and 13 is thus also successfully reduced.

It will be observed from a consideration of FIG. 2 that the abutments 32 on the second push block 18 are so positioned relative to the respective flexible linkages 26 that the links 27 and 28 of each linkage will not exactly align when the tandem tractorscraper units are in pulling relation. In this manner the linkages 26 will readily flex and smoothly return to the positions shown in FIG. 1 as the bail 23 succeedingly disengages the pulling hook 16.

While the various objects of my invention, either expressly stated or otherwise, are believed to have been fully accomplished in the preferred form of the push-pull coupling shown and described hereinbefore, it is also understood that the invention itself is not to be restricted by the exact showing of the drawings or the description thereof, as many modifications will readily occur to the specialists on the basis of this disclosure. It is therefore appropriate that the invention be construed broadly and in a manner consistent with the spirit and scope of the subjoined claims.

I claim:

1. In a push-pull coupling for a tandem arrangement of tractor-scraper units wherein a first coupling section is provided which includes a first push block formed at the rear of one tractor-scraper unit and a pulling hook fixedly mounted over said first push block, the combination of said first coupling section with a second coupling section arranged on the front of the other tractor-scraper unit which includes tractor framework, said second coupling section comprising, in combination:

support means secured to said tractor framework on the front of said other tractor-scraper unit;

a second push block pivotally supported at its top end by said support means and adapted for contact with said first push block to establish a pushing relation between the tractor-scraper units;

a bail pivotally connected to said second push block at the bottom end of the latter and adapted for engagement of said pulling hook to establish a pulling relation between the tractor-scraper units;

two-way shock-absorber means arranged between the bottom end of said second push block and said tractor framework, said two-way shockabsorber means being dually effective to lessen the shock caused upon contact between said first and second push blocks and upon engagement of said pulling hook by said bail, and means for limiting the pivotal motion of said second push block upon engagement with said first push block in either a pushing or pulling operation.

2. The push-pull coupling as recited in claim 1, wherein said two-way shock-absorber means includes at least one two-way shock-absorber assembly which comprises:

a cylindrical housing fixedly mounted on said tractor framework;

a rod extending axially through said housing and having a front end portion projecting outwardly therefrom for pivotal connection to said second push block, said rod being movable axially of said housing in either direction;

a partition dividing the interior of said housing into a pair of opposed chambers, said rod slidably extending through said partition;

a shock-absorbing medium accommodated in each of said chambers;

a pair of retainers normally positioned at both ends of said housing each to hold one of said shock-absorbing media between itself and said partition, each retainer being movable axially of said housing toward and away from said partition to cause compression and expansion of the shock-absorbing medium associated therewith; and means for transmitting the movement of said rod to said retainers in such a manner that each retainer will move simultaneously with, and in the same direction as, said rod while the other retainer is held in its normal position.

3. The push-pull coupling as recited in claim 2, wherein each said shock-absorbing medium comprises a plurality of annular pads of resilient material arranged in coaxial relationship, said annular pads surrounding said rod with clearance.

4. The push-pull coupling as recited in Claim 1, wherein said limiting means comprises:

means for limiting the pivotal motion of said second push block upon engagement of said pulling hook by said bail during a pulling operation.

5. The push-pull coupling as recited in claim 4, wherein said limiting means comprises a pair of flexible linkages connecting the bottom end of said second push block to said support means, each flexible linkage including two links pivotally connected to each other and to said second push block and said support means, respectively, and wherein said second push block has formed thereon an abutment adapted to prevent said links of each said flexible linkage from exactly aligning with each other when the tractorscraper units are in the pulling relation, whereby each said flexible linkage will readily flex when said bail succeedingly disengages said pulling hook.

* * * * *